Figure 4:
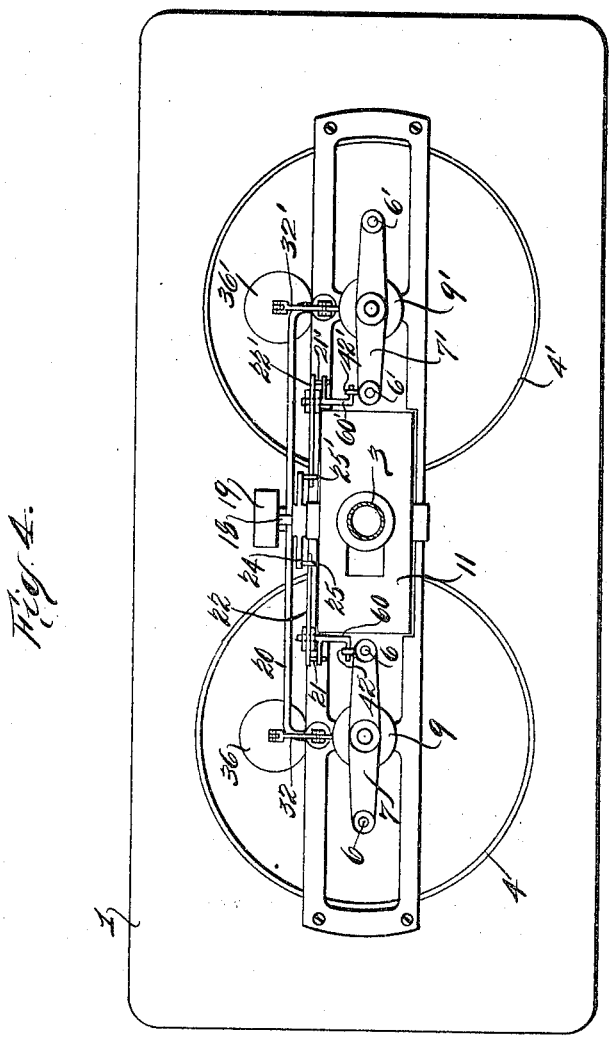

H. LJUNGKRANTZ.
VOLUMETRIC APPARATUS FOR LIQUIDS.
APPLICATION FILED JULY 26, 1911.
1,032,555.
Patented July 16, 1912.
2 SHEETS—SHEET 1.
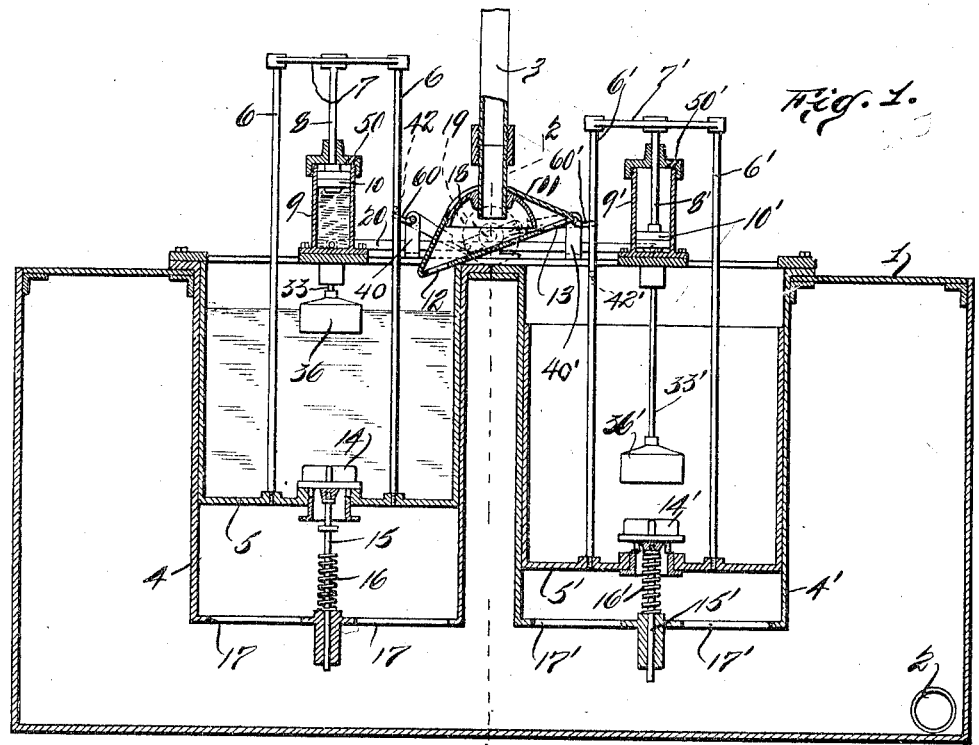
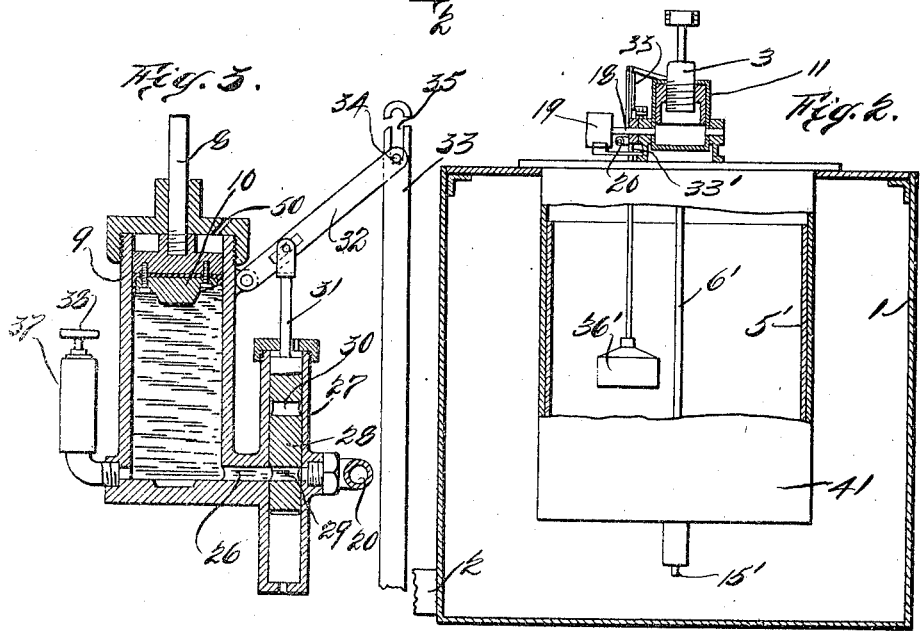

H. LJUNGKRANTZ.
VOLUMETRIC APPARATUS FOR LIQUIDS.
APPLICATION FILED JULY 26, 1911.

1,032,555.

Patented July 16, 1912.
2 SHEETS—SHEET 2.

Witnesses:
Beatrice Mivis
Florence Jackson

Inventor:
Hilding Ljungkrantz
Nuwell&t Eol
Attorneys.

UNITED STATES PATENT OFFICE.

HILDING LJUNGKRANTZ, OF LONG ISLAND CITY, NEW YORK, ASSIGNOR OF ONE-HALF TO JOSEPH EMERY VALENTINE, OF LONG ISLAND CITY, NEW YORK.

VOLUMETRIC APPARATUS FOR LIQUIDS.

1,032,555.      Specification of Letters Patent.      Patented July 16, 1912.

Application filed July 26, 1911. Serial No. 640,565.

*To all whom it may concern:*

Be it known that I, HILDING LJUNGKRANTZ, a subject of the King of Sweden, residing at 118 Third street, Long Island City, New York, have invented certain new and useful Improvements in Volumetric Apparatus for Liquids, of which the following is a clear, full, and exact description.

This invention relates to a volumetric apparatus for quantitatively measuring liquids and accurately registering the amounts thus measured.

The object of the present invention is to provide a simple and effective construction of this character which will be positive and accurate in its operation and which will measure equally well and without leakage a supply of liquid thereto even though said supply be irregular and with uneven pressure and velocity.

Furthermore, the present apparatus is designed to be automatically operated by the flow of liquid therethrough while positively determining the amount of said flow under all conditions, thus particularly adapting it for use as a water meter.

For the attainment of these ends and other and further objects as will hereinafter appear, this invention consists of certain novel features of construction and general combination of parts, all of which will be more particularly described in the following specification and pointed out as to scope in the appended claims.

In the drawings, which show a preferred embodiment of my invention, Figure 1 is a vertical section longitudinally through the entire apparatus; Fig. 2 is a vertical section transversely of the apparatus along line 2—2 Fig. 1 showing certain parts cut away; Fig. 3 is an enlarged detail section of the pumping cylinders; and Fig. 4 is a plan view of the apparatus.

Referring more particularly to the drawings, 1 indicates the main casing of the apparatus which is closed on the sides and bottom to form a receptacle for the liquid, and which receptacle has an outlet 2 at the lower end thereof. The liquid to be measured may be conducted to the apparatus by any convenient conduit, such as 3. shown at the upper central portion thereof. Supported within the casing 1 is a pair of guide shells 4 and 4', having exit openings 17 and 17' through the bottom thereof, and slidably mounted within these shells are tanks 5 and 5', preferably cylindrical in shape. The tanks 5, 5' are closed at the bottom so as to retain liquid therein, but are provided with valves 14 and 14' which are adapted to be opened at the proper times for emptying said tanks, as will be hereinafter described. Each tank 5, 5' has associated therewith a pump consisting of a cylinder 9 and 9', respectively, and a piston 10 and 10'. Each tank is also operatively connected to its associated pump by connecting rods 6, 6', crosshead 7, 7' and piston rod 8, 8' so that any movement of the tank 5 or 5', either up or down, is accompanied by a similar movement of the piston 10 or 10'. The cylinders 9 and 9' of these pumps are connected at their lower ends by a pipe 20, and it is understood that a sufficient quantity of fluid, such as oil or water, is contained in the pumps for completely filling one of them.

The tanks 5 and 5' are arranged to have an up and down movement within their shells 4 and 4', and are connected to their respective pumps so that one will be raised when the other is lowered, as shown in Fig. 1. The power for giving the tanks their up and down movement is supplied by the weight of liquid passing through the apparatus, and the means for utilizing this power will now be described.

Located below the inlet pipe 3 and intermediate the two tanks 5 and 5' is an oscillating deflector 11, carried on rocking shaft 18 and having outlets 12 and 13 at each end thereof. In Fig. 1 this deflector is shown in position to direct liquid from the pipe 3 into tank 5. Fixed intermediate its ends to the shaft 18 is a rocking arm 24 having pins 25, 25' at opposite ends thereof, which pins are adapted to be struck at alternate times by one end of levers 22 and 22', which are pivoted on standards 40 and 40' on the main casing. The opposite ends of the levers 22 and 22' are adapted to be engaged by pivoted latches 60, 60' one adjacent each lever 22, 22' respectively, which latches in turn are operated by pins 42, 42' carried by rods 6 and 6' of the tanks 5 and 5', so that when either tank is in its upward position and starts to descend, its pin 42 or 42' will depress latch 60 or 60' and through the connections above described, throw the deflector 11 into its other position for filling the other tank. The latches 60 and 60' per mit the pins 42, 42' in their upward movement to freely pass levers 22, 22' without actuating the same.

The communication between the pump cylinders 9 and 9' through pipe 20 is controlled by a valve mechanism which is operated in turn by floats carried in each tank, whereby when the tank has received a predetermined quantity of liquid, the valve mechanism will be operated to open communication between the two pump cylinders and permit the loaded tank to descend, which, acting through its pump, will elevate the other empty tank into position for receiving a supply. A separate valve device is provided for each pump, and a description of one of such devices, such as shown connected to pump cylinder 9 in Fig. 3 will suffice. Located between the pump cylinder 9 and the conduit 20 is the valve casing 27 having a slide valve 28 working therein. Said slide valve 28 is provided with an upper port 30 and lower port 29 which, when registering with the outlet 26 of the pump cylinder, opens communication between said cylinder and the pipe 20. The valve stem 31 is connected through lever 32 with an operating rod 33, said rod having a slotted upper end 35 for receiving a pin 34 of the lever 32, while at its lower end said operating rod 33 is provided with a float 36 as shown in Fig. 1. It will be obvious from the above description that the valve 28 is moved in its upward position as shown in Fig. 3, to place in register port 29, and outlet 26 when the liquid in the tank 5 has raised the float 36 to the necessary height, and that said connections may be adjusted so as to operate the valve 28 when a predetermined quantity of liquid enters the tank 5. It is also understood that when the tank is empty, its float 36 or 36' will descend by its own weight and move the valve 28 downwardly to cause the upper port 30 to register with outlet 26, and the operating rod is connected at its upper end to the lever 32 for providing sufficient lost motion between said parts to allow the operating rod to descend a short distance before operating the valve 28.

Each cylinder, such as 9, is provided with a supplemental supply chamber 37 for liquid controlled by a hand-wheel 38 for keeping the proper amount of liquid in said cylinders. Each pump cylinder 9 and 9' is also provided with air holes 50 and 50' respectively.

At the bottom of each tank 5 and 5' is a lift valve 14, 14', having a guide stem 15, 15' working through the bottom of shell 4, 4'. Surrounding each stem 15 and 15' is a coiled spring 16, 16', respectively, which acts to elevate and open its valve and thus allow the liquid in its respective tank to escape when the same is in its lower position, as will be obvious. It is understood that a very slight upward movement of either tank from its lower position is sufficient to allow valve 14 or 14' to close, and that this movement of the lower tank takes place to close the valve before the deflector is oscillated to direct liquid into said tank.

The oscillating deflector 11 which is thrown back and forth by the up and down movement of the tanks, is connected through its shaft 18 with any of the usual registering devices such as 19, whereby the number of times each tank is filled and emptied is accurately registered.

The operation of the present apparatus may be briefly summarized as follows:— When the parts are in the position shown in Fig. 1, water or liquid entering pipe 3 will be deflected into the tank 5 shown in elevated position. When a predetermined quantity of liquid has entered said tank 5 to raise the float 36 a sufficient distance to operate valve 28, port 29 will register with outlet 26 as shown in Fig. 3. It will be understood that a similar device to that shown in Fig. 3 is attached to pump cylinder 9', and that its upper valve port 30 (not shown) will be in registration with the inlet of said pump cylinder 9', since the float 36' is in its lower position. Communication thus being open between pump cylinders 9 and 9', the loaded tank 5 will start to descend under the force of gravity, carrying with it piston 10, which will drive the liquid in pump cylinder 9 over into pump cylinder 9', and through piston 10' act to raise the empty tank 5'. As soon as the loaded tank 5 has started to move, its pin 42 will act to throw the deflector 11 into the opposite position from that shown in Fig. 1 so as to direct liquid to tank 5'. When the loaded tank 5 has reached its lower position, its lift valve 14 will be automatically operated allowing the contained liquid to escape. The operation thus described with respect to tank 5 is repeated with tank 5', and in this way the apparatus will continue to operate as long as the liquid is supplied thereto, and it is equally obvious that it will operate just as efficiently under a fast or a slow flow of liquid therethrough, and that absolutely all of the liquid passing through the apparatus is measured and its quantity registered.

What I claim is:

1. In a volumetric apparatus for liquids in combination, a pair of movably mounted tanks adapted to alternately receive and discharge therefrom a quantity of liquid, fluid-pressure means operated by the movement of each loaded tank for presenting the unloaded tank in position for receiving a supply of liquid, and means for controlling the fluid pressure means adapted to prevent each tank from moving until a certain quantity of liquid has been supplied thereto.

2. In a volumetric apparatus for liquids in combination, a pair of movably mounted tanks adapted to alternately receive and discharge therefrom a quantity of liquid, fluid-pressure means operated by the movement of each loaded tank for presenting the unloaded tank in position for receiving a supply of liquid, an automatically operated device for emptying each tank when thus moved under its load, and float-operated valve mechanism actuated by a measured amount of liquid in said tanks for causing said fluid-pressure means to operate.

3. A water meter comprising in combination, a pair of movably mounted tanks for receiving and discharging a quantity of liquid therefrom and adapted to alternately rise and descend, means for alternately directing liquid into each of said tanks for loading the same, and fluid-pressure means operated by the descent of each loaded tank for raising the unloaded tank, comprising a pump for each tank operatively connected thereto, and a fluid connection between said pumps for causing each to operate the other, float-operated valve mechanism actuated by a measured quantity of liquid in said tanks for controlling communication between said pumps and a registering device operatively connected to said movable tanks.

4. A water meter comprising in combination, a pair of movably mounted tanks for receiving and discharging therefrom a quantity of liquid and adapted to alternately rise and descend, an oscillating deflector for directing liquid into each of said tanks alternately, operated by the movement thereof, and fluid-pressure means operated by the descent of each loaded tank for raising the unloaded tank, comprising a pump for each tank having its piston operatively connected thereto, a fluid connection between said pump cylinders for causing each to operate the other, a valve mechanism for controlling the communication between said pump cylinders comprising an inlet for each cylinder and a valve therefor, together with a float in each tank connected to said valve for operating the same, and a registering device operatively connected to said movable tank.

Signed at New York city, New York this 20 day of July, 1911.

HILDING LJUNGKRANTZ.

Witnesses:
C. T. NEAL,
JOSEPH E. VALENTINE.